United States Patent
Tsai

(10) Patent No.: US 8,411,810 B2
(45) Date of Patent: Apr. 2, 2013

(54) RECEIVING CIRCUIT WITH ADAPTIVE SYNCHRONIZATION AND METHOD THEREOF

(75) Inventor: Meng Che Tsai, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1031 days.

(21) Appl. No.: 12/418,952

(22) Filed: Apr. 6, 2009

(65) Prior Publication Data

US 2009/0257541 A1    Oct. 15, 2009

(30) Foreign Application Priority Data

Apr. 9, 2008  (TW) ............................... 97112743 A

(51) Int. Cl.
*H04L 25/00* (2006.01)
*H04L 25/40* (2006.01)

(52) U.S. Cl. ........ 375/370; 375/372; 375/373; 375/375; 375/377

(58) Field of Classification Search .................. 375/371, 375/372, 364, 354, 360
See application file for complete search history.

(56) References Cited

U.S. PATENT DOCUMENTS

| 5,396,522 | A  | * | 3/1995 | Laflin ........................... 375/364 |
| 5,761,255 | A  | * | 6/1998 | Shi ................................. 375/360 |
| 6,472,913 | B2 | * | 10/2002 | Natsume ....................... 327/144 |
| 6,535,023 | B1 | * | 3/2003 | Williams et al. ................. 327/24 |
| 6,993,105 | B1 | * | 1/2006 | Little et al. ..................... 375/360 |
| 2002/0181375 | A1 | * | 12/2002 | Fukuda et al. ............. 369/59.22 |
| 2007/0081619 | A1 | * | 4/2007 | Kuo et al. ...................... 375/371 |

FOREIGN PATENT DOCUMENTS

CN    1909376 A    2/2007

OTHER PUBLICATIONS

Chinese Patent Office, Office Action, Dec. 2, 2010, pp. 1-4.

\* cited by examiner

*Primary Examiner* — Daniel Washburn
*Assistant Examiner* — Qutbuddin Ghulamali
(74) *Attorney, Agent, or Firm* — Edell, Shapiro & Finnan, LLC

(57) ABSTRACT

A circuit with adaptive synchronization and a method thereof is provided. The synchronous receiving circuit adaptively adjusts the timing of a clock signal generated therein for receiving data without accompanying a clock signal for synchronization. The synchronous receiving circuit includes a clock generator, an edge detector, a synchronization unit and a latch. The clock generator generates a first clock signal according to an input data signal. The edge detector detects edges to generate an indication signal. The synchronization unit is coupled to the clock generator and the edge detector, and adaptively adjusts the first clock signal according to the indication signal. The latch latches the input data signal according to the adjusted first clock signal.

18 Claims, 5 Drawing Sheets

RECEIVING CIRCUIT WITH ADAPTIVE SYNCHRONIZATION AND METHOD THEREOF

CROSS REFERENCE TO RELATED PATENT APPLICATION

This patent application is based on Taiwan, R.O.C. patent application No. 097112743 filed on Apr. 9, 2008.

FIELD OF THE INVENTION

The present invention relates to a receiving circuit, and more particularly, to a receiving circuit with adaptive synchronization and method thereof.

BACKGROUND OF THE INVENTION

During data transmission of a communication system, a clock signal is generated within a receiver when a transmitter provides only data signals but not a clock signal for the receiver to perform synchronization. FIG. 1A shows an ideal situation where a data signal, being free of jitter, has a frequency of f MHz, and a clock signal generated within a receiver has a frequency of 2f MHz. When the receiver latches every falling edge of the clock signal, correct latch data is obtained as shown in FIG. 1A. However, when jitter occurs in the data signal, timing drift is caused, resulting in errors in the latched data at the receiver, as shown in FIG. 1B. Suppose appropriate calibration is not carried out on the timing of the clock signal with respect to the signal jitter at the receiver, timing drift will increase with time and eventually lead to errors in all subsequent latched data.

SUMMARY OF THE INVENTION

Therefore, it is one of the objectives of the invention to provide a receiving circuit with adaptive synchronization and a method thereof. When a transmitter provides data without a clock signal for a receiver for synchronization, the receiving circuit with adaptive synchronization and the method thereof according to the present invention adaptively adjust the timing of a clock signal generated therein for performing synchronized reception, thereby preventing the foregoing issue.

A receiving circuit with adaptive synchronization provided by an embodiment of the invention comprises: a clock generator, synchronously generating a first clock signal according to an input data signal; an edge detector, for detecting edges on the input data signal to generate an indication signal; a synchronization unit, coupled to the clock generator and the edge detector, for adaptively adjusting the timing of the first clock signal according to the indication signal; and a latch, coupled to the synchronization unit, for latching the input data signal according to the adjusted first clock signal.

A receiving method with adaptive synchronization provided by an embodiment the invention comprises steps of: generating a first clock signal according to an input data signal, performing edge detection on the input signal to generate an indication signal, and adaptively adjusting the timing of the first clock signal according to the indication signal.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1A:
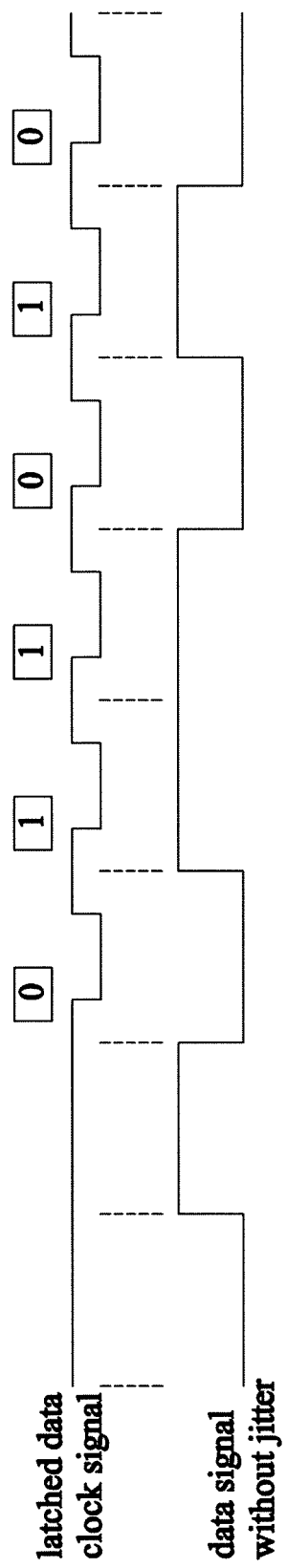
FIG. 1A is a schematic diagram illustrating latching a data signal without jitter using a self-generated clock signal at a receiver end according to the prior art.
Figure 1B:
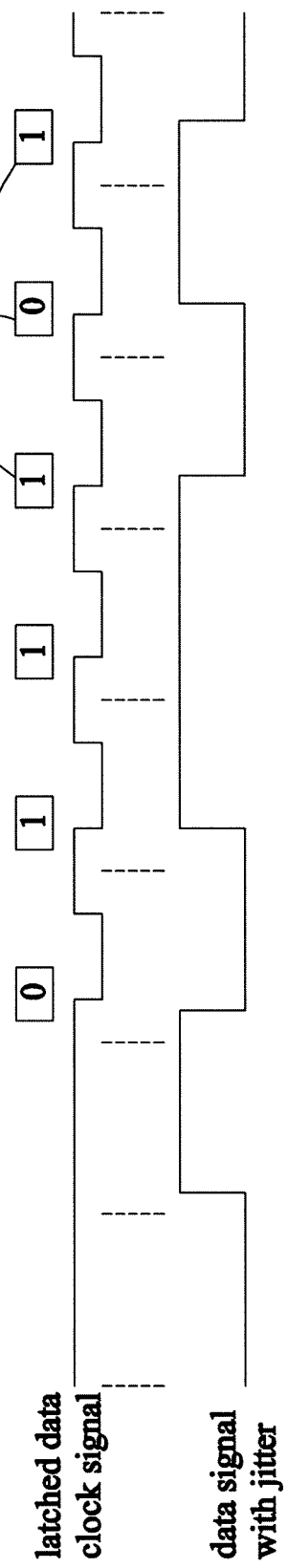
FIG. 1B is a schematic diagram illustrating latching a data signal with jitter using a self-generated clock signal at a receiver end according to the prior art.
Figure 2:
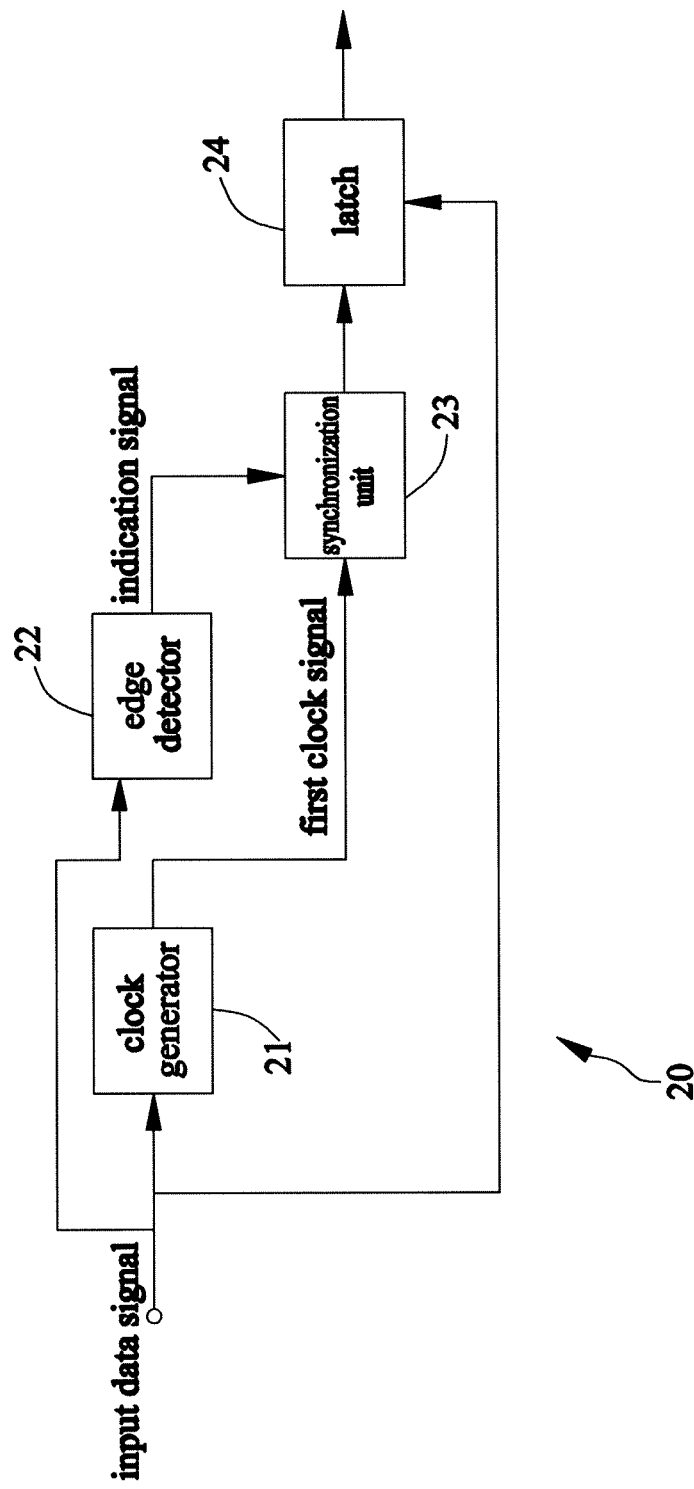
FIG. 2 is a block diagram of a receiving circuit with adaptive synchronization according to one embodiment of the invention.

FIG. 2 shows a block diagram of a receiving circuit 20 with adaptive synchronization according to one embodiment of the invention. The receiving circuit 20 comprises a clock generator 21, an edge detector 22, a synchronization unit 23 and a latch 24. The receiving circuit 20 receives an input data signal without external clock signals. The clock generator 21 synchronously generates a first clock signal according to the input data signal. The clock generator 21 generates a clock signal for subsequent data latch by referencing timing information of the input data signal. The input data signal is a digital signal, of which data is represented in low level and high level. The edge detector 22 performs edge detection on the input data signal to generate an indication signal. Edge detection detects transitions of the input data signal. A rising edge represents a low level switching to a high level. A falling edge represents a high level switching to a low level. The indication signal indicates the transitions of the input data signal. Therefore, the timing of the indication signal falls behind the rising edge or falling edge of the input data signal with a range preferably determined according to a set-up time (e.g., a transition time) of the input data signal. The set-up time represents time needed by the input data signal to reach stabilization, and may thus be applied to indicate the timing of the input data signal having reached stabilization to facilitate subsequent data latch. An objective of the receiving circuit 20 is to adjust and synchronize the timing of the first clock signal, e.g. the rising edge or the falling edge of the first clock signal, with the indication signal to ensure accuracy of the latched data.

The synchronization unit 23, coupled to the clock generator 21 and the edge detector 22, adaptively adjusts a phase of the first clock signal according to the indication signal to optimize the sampling timing represented by the first clock signal. When a current timing difference, between an assertion timing of the indication signal and a predetermined transition point of the first clock signal, represents the indication signal falls behind the first clock signal, the synchronization unit 23 delays the timing of the first clock signal. That is, a next rising edge or falling edge of the first clock signal is delayed. In contrast, when the current timing difference represents the indication signal comes ahead of the first clock signal, the synchronization unit 23 advances the timing of the first clock signal. The latch 24, coupled to the synchronization unit 23, latches the input data signal according to the adjusted first clock signal.

Figure 3:
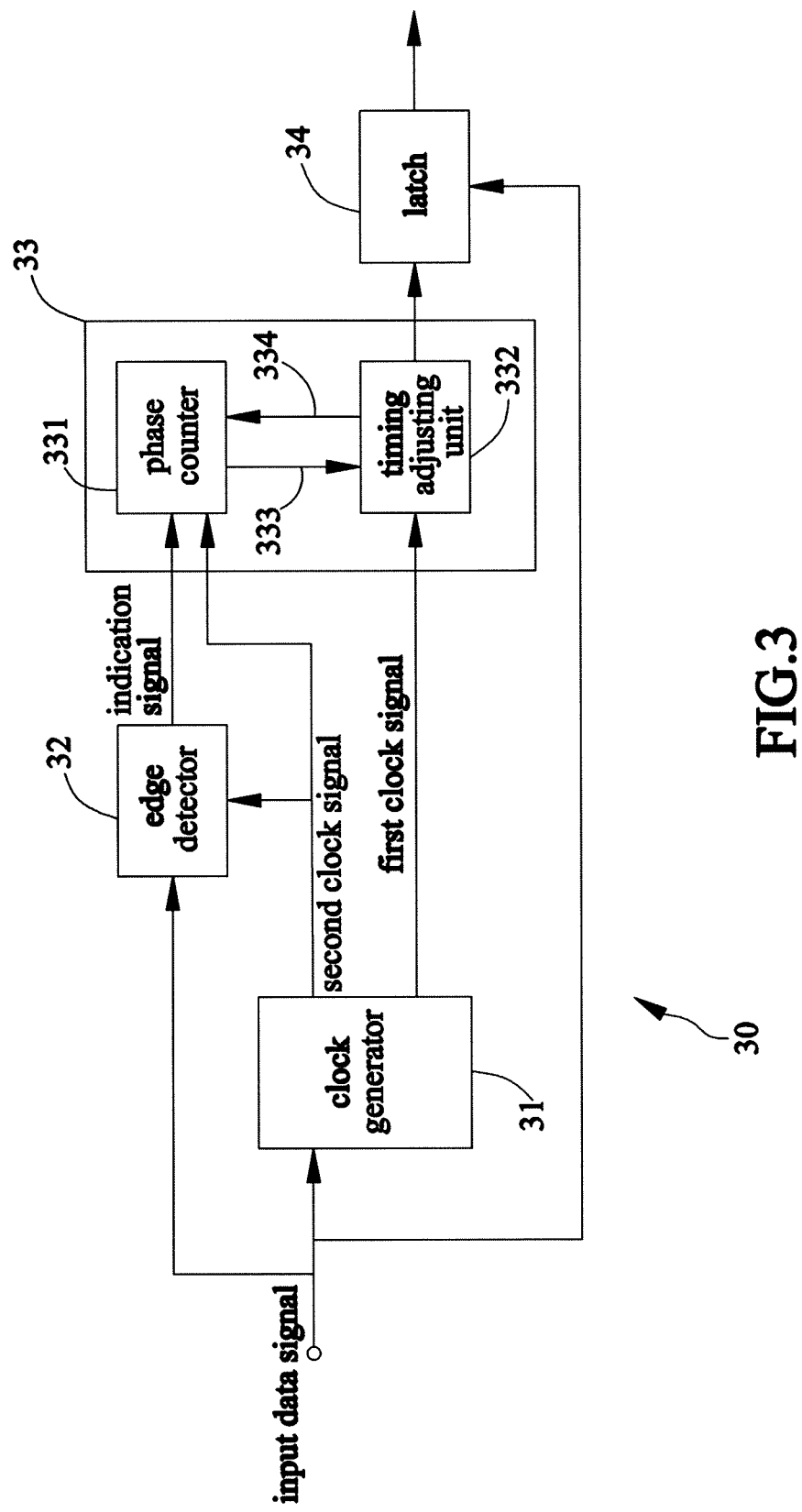
FIG. 3 is a block diagram of a receiving circuit with adaptive synchronization according to one preferred embodiment of the invention.

FIG. 3 shows a block diagram of a receiving circuit 30 with adaptive synchronization according to one preferred embodiment of the invention. A clock generator 31 synchronously generates a first clock signal and a second clock signal. A frequency of the second clock signal is n times that of the first clock signal, where n is an integer. For example, regarding the input data signal as a reference timing, the clock generator 31 first generates the second clock signal, and divides the frequency of the second clock signal to generate the first clock signal. An edge detector 32 performs edge detection on the input data signal to generate an indication signal. In this embodiment, the timing of the indication signal falls behind a rising edge or a falling edge of the input data signal. In addition to the range fallen behind being determined according to the set-up time of the input data signal, the set-up time is preferably expressed in a clock period T of the second clock signal. For example, suppose the set-up time is 2T, the edge detector preferably asserts the indication signal at 2T behind the rising edge or the falling edge of the input data signal.

A synchronization unit 33 comprises a phase counter 331 and a timing adjusting unit 332. The phase counter 331, coupled to the clock generator 31 and the edge detector 32, updates a phase counter value according to the second clock signal, wherein the phase counter value represents a phase of the first clock signal. For example, for every "one" increment in the phase counter value, it indicates the first clock signal has undergone a time length of 1T since a previous transition. The phase counter value cyclically goes from 0 to n−1, and each round from 0 to n−1 represents one clock cycle of the first clock signal. In this embodiment, the frequency of the second clock signal is n times of that of the first clock signal. Therefore, the phase counter value indicates a current phase of the first clock signal.

When the edge detector 32 asserts the indications signal to the phase counter 331, the phase counter 331 outputs the current phase counter value via a control signal 333 to the timing adjusting unit 332. Since the phase counter value represents the assertion timing of the indication signal that corresponds to the phase of the first clock signal, the timing adjusting unit 332 obtains a current timing difference between the indication signal and a predetermined transition point of the first clock signal, so as to properly adjust the timing of the first clock signal. For example, when the current timing difference shows that the indication signal falls behind the first clock signal, the timing adjusting unit 332 performs phase compensation to extend the width of a current clock, such as extending by 1T, to delay the timing of the first clock signal. In contrast, when the current timing difference shows that the indication signal comes ahead of the first clock signal, to avoid any data loss, the timing adjusting unit 332 preferably performs re-synchronization to immediately generate a next clock of the first clock signal to allow data latch by a latch 34. Further, the timing adjusting unit 332 may reset the phase counter value via a control signal 334. For example, when the timing adjusting unit 332 is to extend the current clock of the first clock signal by 1T, time that has undergone by the phase counter value asserted by the indication signal is also extended by 1T to become 2T. That is, a same phase counter value is maintained for period of 2T, of which 1T being the phase compensation. One clock cycle of the first clock signal is completed when the phase counter value reaches n−1. The timing adjusting unit 332 may reset the phase counter 331 via the control signal 334 to immediately generate a next clock of the first clock cycle, such that the phase counter value is reset to 0 to indicate starting a next clock.

Figure 4:
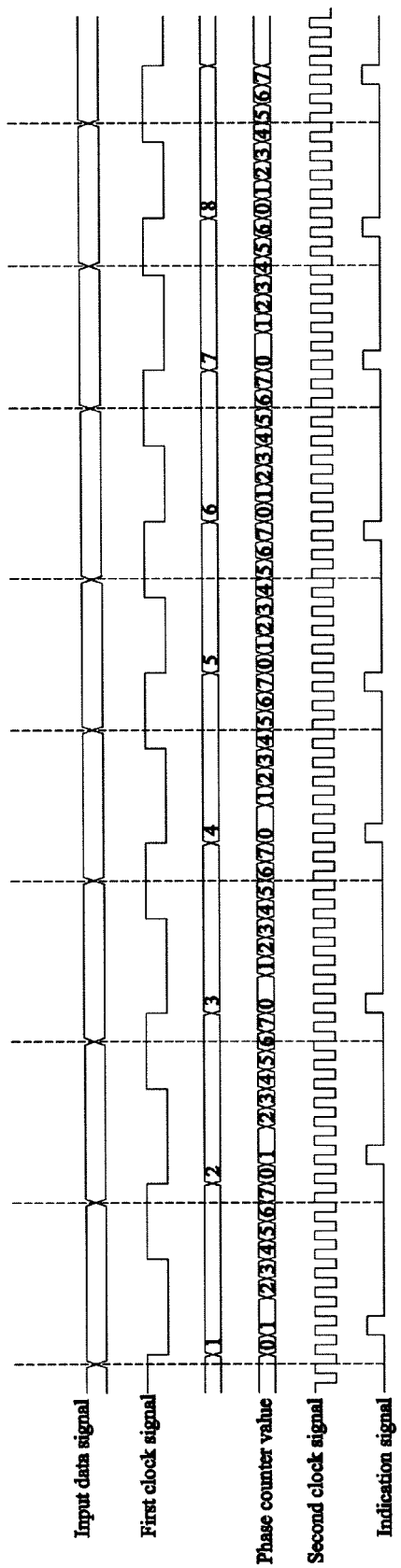
FIG. 4 is a signal timing diagram illustrating operations of the receiving circuit using the adaptive synchronization in FIG. 3.

FIG. 4 shows a signal timing diagram illustrating operations of the receiving circuit 30 with adaptive synchronization in FIG. 3. The receiving circuit 30 may be implemented to a DisplayPort. The input data signal is an aux channel signal of the DisplayPort, e.g. at a frequency of 1 MHz, without external clock signals. The clock generator 31 generates a 2 MHz first clock signal and a 16 MHz second clock signal to receive the aux channel signal. FIG. 4 shows a timing diagram for the aux channel signal, the first clock signal, the second clock signal, the indication signal and the phase counter value. The latch 34 latches data at each falling edge of the first clock signal. The indication signal asserted by the edge detector 32 falls behind each rising edge or falling edge of the aux channel signal at the second rising edge of the second clock signal, e.g. at 2T. Accordingly, the indication signal may be modified to provide an appropriate time length for providing the set-up time of the aux channel signal to ensure the timing for accurately sampling the aux channel signal. The phase counter value of the phase counter 331 goes from 0 to 7 within every clock cycle of the first clock signal.

In this embodiment, in an ideal situation, when the phase counter value corresponding to the asserted indication signal is 7, it represents that no timing difference exists between the indication signal and the first clock signal, and signals are locked to ensure that the falling edge of the first clock signal accurately samples the aux channel signal. Referring to FIG. 4, in the $5^{th}$ and $8^{th}$ clock cycles of the first clock signal, the phase counter value for the assertion of the indication signal is 7, and signals are locked with no compensation in phase difference required. In the $1^{st}$, $2^{nd}$, $3^{rd}$, $4^{th}$ and $7^{th}$ clock cycles, the phase counter value for the assertion of the indication signal is 0 or 1, and the timing adjusting unit 332 determines that the indication signal falls behind the first clock signal and thus performs phase compensation. It should be noted that, two assertions of the indication signal are present in the $4^{th}$ and $7^{th}$ clock cycles, and the first indication signal is referred to in the foregoing description. In this embodiment, a width of a current clock of the first clock signal is extended by 1T as an example; however, for those skilled in the art, modifications can be made. Via the control signal 334, the timing adjusting unit 332 also extends the duration undergone by the phase counter value corresponding to the asserted indication signal by 1T. For example, in the first clock cycle, the duration undergone by the phase counter value 1 is extended to 2T. However, in the $7^{th}$ clock cycle, the phase counter value corresponding to a next asserted indication signal is 6, based on which the timing adjusting unit 332 determines that the indication signal advances the first clock signal and resets to immediately generate the $8^{th}$ clock of the first clock signal as well as resetting the phase counter value to 0 via the control signal 334. In this embodiment, in response to the phase counter value, the timing adjusting unit 332 adaptively compensates the phase by 1T or re-synchronizes the first clock signal by, such as, resetting the phase counter value.

Figure 5:
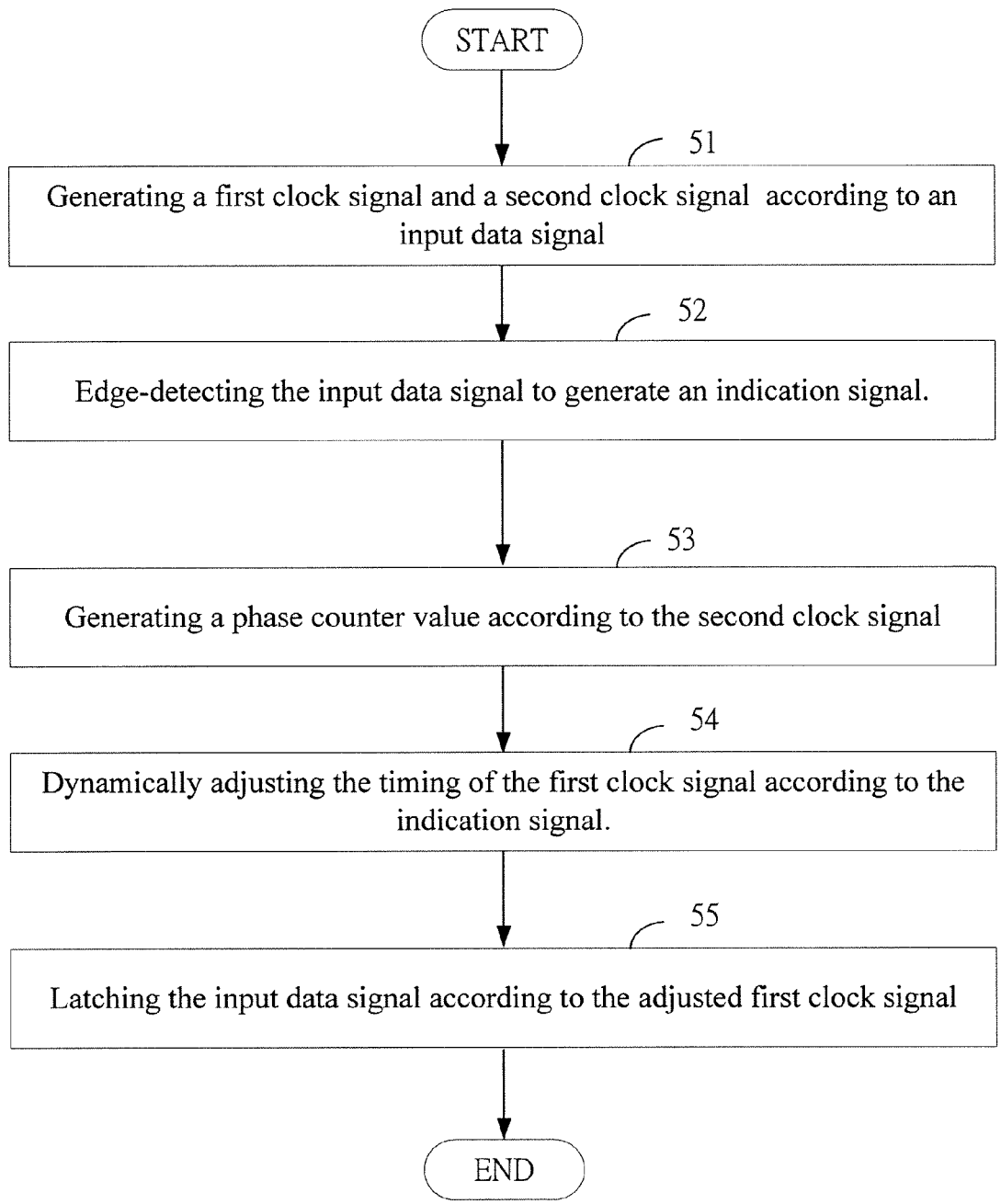
FIG. 5 is a flowchart of a receiving method with adaptive synchronization according to one preferred embodiment of the invention.

FIG. 5 shows a flowchart of a receiving method with adaptive synchronization according to one preferred embodiment of the invention. In Step 51, a first clock signal and a second clock signal are generated according to an input data signal. A frequency of the second clock signal is n times that of the first clock signal, where n is an integer. In Step 52, edge detection is performed on the input data signal to generate an indication signal. The timing of the indication signal falls at a predetermined distance, e.g., 2T, from a rising edge or a falling edge of the input data signal. In Step 53, a phase counter value, representing a phase of the first clock signal, is generated according to the second clock signal. In Step 54, the timing of the first clock signal is adaptively adjusted according to the indication signal. In Step 55, the input data signal is latched according to the adjusted first clock signal.

In Step 51, the first clock signal is preferably generated by dividing the frequency of the second clock signal. In Step 52, a range that the timing of the indication signal falls behind the rising edge or the falling edge of the input data signal is determined according to a set-up time of the input data signal.

In Step 54, the phase counter value corresponding to an assertion of the indication signal determines a current timing difference between the indication signal and the first clock signal. When the current timing difference shows that the indication signal falls behind the first clock signal, the timing of the first clock signal is delayed. In contrast, when the current timing shows that the indication signal advances the first clock signal, the timing of the first clock signal is advanced. Preferably, when the current timing difference shows that the indication signal falls behind the first clock signal, the phase of the first clock signal is adaptively compensated to extend a width of a current clock of the first clock signal. When the current timing difference shows that the indication signal advances the first clock signal, the first clock signal is re-synchronized, e.g., by resetting the phase counter value, to immediately generate a next clock of the first clock signal.

The receiving method with adaptive synchronization according to the invention may be implemented in a DisplayPort interface, and the input data signal is an aux channel signal of the DisplayPort. It should be noted that, the present invention is particularly advantageous for high-speed synchronous signal reception. In a high-speed transmission environment, signal jitter is rapidly accumulated along with high-speed clocks possibly due to increased distance in high-speed transmission lines, such as a DisplayPort cable. Therefore, the scheme of adaptively compensating clock signals according to the invention is capable of achieving the objective of accurately retrieving data for high-speed synchronous signal reception.

Conclusive from above, a receiving circuit with adaptive synchronization disclosed herein comprises a clock generator, an edge detector, a synchronization unit, and a latch. The clock generator generates a first clock signal according to an input data signal. The edge detector performs edge detection on the input data signal to generate an indication signal. The synchronization unit, coupled to the clock generator and the edge detector, adaptively adjusts the first clock signal according to the indication signal. An assertion timing of the indication signal falls at a predetermined distance behind a rising edge or a falling edge of the first clock signal. For example, when the assertion timing of the indication signal falls behind a predetermined transition point of the first clock signal, the synchronization unit delays the timing of the first clock signal; when the assertion timing of the indication signal comes ahead of the predetermined transition point of the first clock signal, the synchronization unit brings forward the timing of the first clock signal. The latch, coupled to the synchronization unit, latches the input data signal according to the adjusted first clock signal.

The invention further provides a receiving method with adaptive synchronization comprising steps of: generating a first clock signal according to an input data signal, performing edge detection on the input data signal to generate an indication signal, adaptively adjusting timing of the first clock signal according to the indication signal, latching the first clock signal when there is no timing difference between the indication signal and the first clock signal, and latching the input data signal according to the adjusted first clock signal. The present receiving method with adaptive synchronization further comprises: synchronously generating a second clock signal according to the input data signal, with a frequency of the second clock signal being n times of that of the first signal, where n is an integer; and updating a phase counter value according to the second clock signal, wherein the phase counter value represents a phase of the first clock signal. In the step of adaptively adjusting, for example, a timing difference between the indication signal and the first clock signal is first detected, and the timing of the first clock signal is then adaptively adjusted according to the timing difference. For example, when the indication signal falls behind a predetermined transition of the first clock signal, the timing of the first clock signal is delayed. When the indication signal advances the predetermined transition of the first clock signal, the timing of the first clock signal is advanced. When the phase counter value at the assertion timing of the indication signal indicates that the indication signal falls behind a predetermined transition point of the first clock signal, phase compensation is performed to extend a width of a current clock of the first clock signal, such as extending the width of the current pulse of the first clock signal to as long as one cycle of the second clock signal. When the phase counter value corresponding to the asserted indication signal indicates that the indication signal advances a predetermined transition of the first clock signal, the first clock signal is reset to immediately generate a next clock.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A receiving circuit with adaptive synchronization, comprising:
 a clock generator, for generating a first clock signal according to an input data signal;
 an edge detector, for performing edge detection on the input data signal to generate an indication signal;
 a synchronization unit, coupled to the clock generator and the edge detector, for adaptively adjusting the first clock signal according to the indication signal; and
 a latch, coupled to the synchronization unit, for latching the input data signal according to the adjusted first clock signal,
 wherein the clock generator synchronously generates a second clock signal according to the input data signal, a frequency of the second clock signal is n times that of the first clock signal, where n is a positive integer, the synchronization unit comprises a phase clock counter for updating a phase counter value according to the second clock signal, and the phase counter value represents a phase of the first clock signal.

2. The receiving circuit as claimed in claim 1, wherein an assertion of the indication signal falls at a predetermined distance behind a rising edge or a falling edge of the input signal data.

3. The receiving circuit as claimed in claim 2, wherein the predetermined distance is determined by a set-up time of the input data signal.

4. The receiving circuit as claimed in claim 1, wherein the synchronization unit delays the timing of the first clock signal when the assertion of the indication signal falls behind a predetermined transition point of the first clock signal.

5. The receiving circuit as claimed in claim 1, wherein the synchronization unit advances the timing of the first clock signal when the assertion of the indication signal advances a predetermined transition of the first clock signal.

6. The receiving circuit as claimed in claim 1, wherein the first clock signal is generated by frequency-dividing the second clock signal.

7. The receiving circuit as claimed in claim 1, wherein the synchronization unit further comprises:
a timing adjusting unit, coupled to the phase counter and the clock generator, for adaptively adjusting the timing of the first clock signal according to the phase counter value corresponding to the asserted indication signal.

8. The receiving circuit as claimed in claim 7, wherein when the phase counter value corresponding to the asserted indication signal indicates that the indication signal falls behind the first clock signal, the timing adjusting unit performs phase compensation to extend a width of a current clock of the first clock signal.

9. The receiving circuit as claimed in claim 7, wherein when the phase counter value corresponding to the asserted indication signal indicates that the indication signal advances the first clock signal, the timing adjusting unit resets the first clock signal to immediately generate a next clock of the first clock signal.

10. The receiving circuit as claimed in claim 1, wherein the input data signal is an aux channel signal of a DisplayPort.

11. A receiving method with adaptive synchronization, comprising steps of:
generating, using a clock generator within a data communication receiver, a first clock signal according to an input data signal;
performing edge detection on the input data signal to generate an indication signal;
adaptively adjusting timing of the first clock signal according to the indication signal;
synchronously generating a second clock signal according to the input data signal, a frequency of the second clock signal being n times of that of the first clock signal, where n is a positive integer; and
updating a phase counter value according to the second clock signal, the phase counter value representing a phase of the first clock signal.

12. The receiving method as claimed in claim 11, wherein the step of adaptively adjusting comprises steps of:
detecting a timing difference between the indication signal and the first clock signal; and
adaptively adjusting the timing of the first clock signal according to the timing difference.

13. The receiving method as claimed in claim 12, further comprising a step of:
latching the input data signal according to the adaptively adjusted first clock signal.

14. The receiving method as claimed in claim 11, wherein an assertion of the indication signal falls at a predetermined distance behind a rising edge or a falling edge of the input data signal.

15. The receiving method as claimed in claim 14, wherein the predetermined distance is determined according to a set-up time of the input data signal.

16. The receiving method as claimed in claim 11, wherein the step of adaptively adjusting delays the timing of the first clock signal when the indication signal falls behind a predetermined transition of the first clock signal.

17. The receiving method as claimed in claim 11, wherein the step of adaptively adjusting advances the timing of the first clock signal when the indication signal advances a transition of the first clock signal.

18. The receiving method as claimed in claim 11, wherein the step of adaptively adjusting extends a width of a current clock of the first clock signal when the phase counter value corresponding to the asserted indication signal indicates that the indication signal falls behind a predetermined transition of the first clock signal.

* * * * *